US010655245B2

United States Patent
Geng et al.

(10) Patent No.: US 10,655,245 B2
(45) Date of Patent: May 19, 2020

(54) METAL OXIDE MACROSCOPIC FIBER AND PREPARATION METHOD THEREOF

(71) Applicant: SOOCHOW UNIVERSITY, Suzhou (CN)

(72) Inventors: Fengxia Geng, Suzhou (CN); Junyu Hou, Suzhou (CN); Yuanchuan Zheng, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 307 days.

(21) Appl. No.: 15/760,254

(22) PCT Filed: Sep. 16, 2015

(86) PCT No.: PCT/CN2015/089816
§ 371 (c)(1),
(2) Date: Mar. 15, 2018

(87) PCT Pub. No.: WO2017/045181
PCT Pub. Date: Mar. 23, 2017

(65) Prior Publication Data
US 2018/0258554 A1  Sep. 13, 2018

(51) Int. Cl.
*D01D 5/06* (2006.01)
*C04B 35/622* (2006.01)
(Continued)

(52) U.S. Cl.
CPC .......... *D01D 5/06* (2013.01); *C04B 35/6264* (2013.01); *C04B 35/62231* (2013.01);
(Continued)

(58) Field of Classification Search
CPC .......................... D01D 5/06; C04B 35/62231
See application file for complete search history.

(56) References Cited

U.S. PATENT DOCUMENTS 3,558,763 A * 1/1971 Quynn et al. ............. D01F 6/60
264/203
3,619,453 A * 11/1971 Riggs ....................... D01F 9/24
264/184
(Continued)

FOREIGN PATENT DOCUMENTS

| CN | 1584156 A | 2/2005 |
|---|---|---|
| CN | 101041127 A | 9/2007 |
| CN | 101517677 A | 8/2009 |

OTHER PUBLICATIONS

Namburu, P.K., Kulkarni, D.P., Misra, D. and Das, D.K., 2007. Viscosity of copper oxide nanoparticles dispersed in ethylene glycol and water mixture. Experimenta Thermal and Fluid Science, 32(2), pp. 397-402. (Year: 2007).*
(Continued)

*Primary Examiner* — Leith S Shafi
*Assistant Examiner* — Nicholas R Krasnow
(74) *Attorney, Agent, or Firm* — SZDC Law PC

(57) ABSTRACT

A metal oxide macroscopic fiber and a preparation method thereof, the method including: adding, as a spinning dope, an anionic metal oxide aqueous colloidal solution into wet spinning equipment, extruding the spinning dope from the spinning equipment into a thread, injecting the extruded thread into a coagulating bath containing a flocculating agent to obtain as-spun fiber, and repeatedly washing the resulted as-spun fiber with deionized water and drying same, thereby obtaining a metal oxide fiber. Said method makes the process simple and controllable, being adaptable to production on a large scale. The prepared metal oxide fiber having special physical and chemical properties is widely applicable in terms of intelligent spinning, biomedicine, energy recycling and conversion, and the field of microelectronic devices and the like.

9 Claims, 2 Drawing Sheets

(51) Int. Cl.
*C04B 35/632* (2006.01)
*C04B 35/626* (2006.01)
*D01D 10/06* (2006.01)
*D01F 9/08* (2006.01)

(52) U.S. Cl.
CPC ...... *C04B 35/62259* (2013.01); *C04B 35/632* (2013.01); *D01D 10/06* (2013.01); *D01F 9/08* (2013.01); *C04B 2235/3205* (2013.01); *C04B 2235/326* (2013.01); *C04B 2235/3208* (2013.01); *C04B 2235/3213* (2013.01); *C04B 2235/3224* (2013.01); *C04B 2235/3227* (2013.01); *C04B 2235/3253* (2013.01); *C04B 2235/3255* (2013.01); *C04B 2235/3258* (2013.01); *C04B 2235/3262* (2013.01); *C04B 2235/3268* (2013.01); *C04B 2235/3274* (2013.01); *C04B 2235/3275* (2013.01); *C04B 2235/3289* (2013.01); *C04B 2235/3298* (2013.01); *C04B 2235/79* (2013.01); *D10B 2101/02* (2013.01)

(56) References Cited

U.S. PATENT DOCUMENTS

| | | | |
|---|---|---|---|
| 4,166,147 A | | 8/1979 | Lange et al. |
| 4,243,480 A | * | 1/1981 | Hernandez ............ D01F 9/00 162/141 |
| 4,735,924 A | * | 4/1988 | Arons ................ B28B 3/003 252/62.56 |
| 5,049,338 A | * | 9/1991 | Varaprasad ............ C03B 19/12 264/183 |
| 5,064,596 A | * | 11/1991 | Chida ................ C04B 35/45 264/181 |
| 5,089,188 A | * | 2/1992 | Varaprasad ......... C04B 35/6224 264/183 |
| 5,667,743 A | * | 9/1997 | Tai .................... D01D 5/06 264/184 |
| 5,688,596 A | * | 11/1997 | Makino ............. D01F 6/605 260/DIG. 21 |
| 6,086,844 A | | 7/2000 | Koike et al. |
| 6,156,685 A | * | 12/2000 | Marella ............ C04B 35/6225 423/608 |
| 6,451,059 B1 | * | 9/2002 | Janas ................ A61F 2/28 427/2.27 |
| 2002/0113336 A1 | * | 8/2002 | Cass ............. C04B 35/62227 264/187 |
| 2005/0093198 A1 | * | 5/2005 | Rodini ............. D01F 6/605 264/184 |
| 2009/0169884 A1 | * | 7/2009 | Ekiner ............. B01D 61/145 428/398 |
| 2009/0318280 A1 | * | 12/2009 | Mohammadi ......... C04B 35/563 501/87 |
| 2013/0000488 A1 | * | 1/2013 | Kratzer ............. B01D 53/228 96/10 |
| 2013/0025459 A1 | * | 1/2013 | Kosuri ............. B01D 53/228 96/10 |
| 2014/0166571 A1 | * | 6/2014 | Tai ................ B01D 9/082 210/500.23 |
| 2014/0232036 A1 | * | 8/2014 | Inada ............... D01D 5/06 264/178 F |
| 2015/0031801 A1 | * | 1/2015 | Moon .............. D01F 6/12 524/35 |
| 2018/0044187 A1 | * | 2/2018 | Pico ............... D01D 5/12 |

OTHER PUBLICATIONS

Salomão, R. and Brandi, J., 2013. Macrostructures with hierarchical porosity produced from alumina—aluminum hydroxide—chitosan wet-spun fibers. Ceramics International, 39(7), pp. 8227-8235. (Year: 2013).*

Carty, W.M., 1993. Processing of ceramic fibers from particle suspensions. (Year: 1993).*

Mohanty, S., Rameshbabu, A.P. and Dhara, S., 2012. α-Alumina fiber with platelet morphology through wet spinning. Journal of the American Ceramic Society, 95(4), pp. 1234-1240. (Year: 2012).*

Salomão, R. and Brandi, J., 2013. Filamentous alumina—chitosan porous structures produced by gelcasting. Ceramics International, 39(7), pp. 7751-7757. (Year: 2013).*

* cited by examiner

METAL OXIDE MACROSCOPIC FIBER AND PREPARATION METHOD THEREOF

TECHNICAL FIELD

This invention relates to a preparation method of fibers, in particular to a metal oxide macroscopic fiber and preparation method thereof.

BACKGROUND TECHNIQUE

Fiber devices have a unique one-dimensional structure and a variety of functions, have a more extensive application in the smart textiles, sensors, drives, lithium-ion batteries and dye-sensitized batteries and other fields. Therefore, researching on fiber and its preparation methods has become one of the most active development directions in the field of science and technology. At present, the preparation methods of the fibers mainly include wet spinning, dry spinning, melt spinning, gel spinning and electrospinning. Among them, the wet spinning method has the advantages of simple method, easy preparation process, wide range of prepared materials and the like, and is a commonly used method in fiber preparation. The wet spinning method comprises the steps of: (1) preparing a spinning dope, (2) extruding the spinning dope through a spinneret orifices, (3) forming a starting fiber in a coagulation bath containing a flocculant to form as-spun fiber, (4) post-treatment of nascent fiber s.

With the continuous development of science and technology, more and more flexible wearable fiber devices have attracted people's attention. However, preparation process for the current carbon fiber devices (such as graphene fiber devices and carbon nanotube fiber devices) and carbon-based metal oxide composite fiber device is complex, and the degree of functionalization is not high, cannot meet the growing needs of people. Therefore, we need to find a simple and efficient method for preparing multifunctional fiber devices.

Metal oxides with unique physicochemical properties, and usually coated on the polymer nanofiber surface, or blended with the polymer nanofiber raw materials, then to prepare polymer/metal oxide nanocomposite fibers by wet spinning, which can improve the performance of polymer nanofibers. There is no report about macroscopic fibers of single metal oxides. In the prior art, electrospinning generally can only produce metal oxide nanofibers, and the synthesis of precursors is complicated. Organic materials such as PVA are required to be used, and subsequent the process of sintering is performed to remove PVA can cause fiber instability, also pollute the environment. It should be pointed out that the existing methods of electrospinning can not produce metal oxide macroscopic fibers, while the existing wet spinning method can produce polymer/metal oxide composite fibers only, can not be prepared metal oxide macroscopic fibers.

In particular, the orientation of metal oxide nanofibers prepared by the prior art was poor, resulting in poor mechanical properties and unstable structural properties, making a difficult application of metal oxide fibers. The existing methods are not satisfactory for preparing metal oxide macroscopic fibers. Therefore, there is a need to develop a simple and efficient preparation method to obtain good mechanical properties, stable structural properties, and to facilitate the commercial production of metal oxide macroscopic fibers, resulting in a more functionalized fiber device assembled therefrom. It not only expanded the research and application range of metal oxides, but also provided a new idea for the research of flexible sensors and flexible energy storage devices.

Technical Problem

The existing wet spinning method can produce polymer/metal oxide composite fibers only, can not be prepared metal oxide macroscopic fibers. In particular, the orientation of metal oxide nanofibers prepared by the prior art was poor, resulting in poor mechanical properties and unstable structural properties, making a difficult application of metal oxide fibers. The existing methods are not satisfactory for preparing metal oxide macroscopic fibers.

Means for Solving the Problem

Technical Solutions

The purpose of the invention is to provide a simple and controllable preparation method of metal oxide macroscopic fiber, who solves the problems of the prior art that are the metal oxide-containing composite nanofibers can be obtained only by the existing preparation method, and the nanofibers have poor mechanical properties, unstable structural, the difficulty application and other shortcomings.

In order to achieve the above-mentioned object, a specific technical solution of the present invention is as follows:

A method for preparing metal oxide macroscopic fiber, which comprises the following steps:

Anionic metal oxide colloidal aqueous solution was added into wet spinning equipment, then the as-spun fiber was obtained by wet-spun in the coagulating bath; washing said as-spun fiber with deionized water and drying same, thereby obtaining metal oxide macroscopic fiber; said coagulation bath contains the flocculant with the mass fraction is between 0.5% to 5%, and speed of the wet-spun is between 0.1 ml/min to 5 ml/min; total concentration of the metal oxide was 0.1 mg/ml to 20 mg/ml in the anionic metal oxide colloidal aqueous solution.

In the methods above, said anionic metal oxide is manganese oxide, ruthenium oxide, titanium oxide, niobium oxide, tantalum oxide, tungsten oxide, cesium tungsten oxide, calcium niobium oxide, titanium niobium oxide or a mixture thereof. Wherein the manganese oxide is $MnO_2^{x-}$, $0<x<1$, or $A_2Na_{y-3}MnO_{3y+1}^-$ which A is Ca, Sr, Ba, $3 \leq y \leq 6$, said tantalum oxide is $TaO^{3-}$, $SrTa_2O_7^{2-}$, $La_{0.7}Tb_{0.3}Ta_2O_7^-$ or $Eu_{0.56}Ta_2O_7^{2-}$, said tungsten oxide is $W_2O_7^{2-}$, said cesium tungsten oxide is $Cs_4W_{11}O_{36}^{2-}$, said ruthenium oxide is $RuO_{2.1}^{z-}$ or $RuO_2^{z-}$, $0<z<1$, said niobium oxide is $Nb_6O_{17}^{4-}$, $Nb_3O_8^-$, $LaNb_2O_7^-$ or $La_{0.9}Eu_{0.05}Nb_2O_7^-$, said titanium oxide is $Ti_{1-n}O_2^{4n-}$, $0<n<1$, $Ti_{0.8}Co_{0.2}O_2^{0.4-}$, $Bi_4Ti_3O_{12}^{2-}$, $Ti_{0.6}Fe_{0.4}O_2^{0.4-}$, $Ti_{0.8-m/4}Fe_{m/2}Co_{0.2-m/4}O_2^{0.4-}$, $0 \leq m \leq 0.8$, $Ti_{(5.2-2i)/6}Mn_{i/2}O_2^{(3.2-1)/6-}$, $0 \leq i \leq 0.4$ or $RE_2Ti_3O_{10}^{2-}$, in which RE is La, Pr, Sm, Nd, Eu, Gd, Tb or Dy, said calcium niobium oxide is $Ca_2Nb_3O_{10}^-$, said titanium niobium oxide is $TiNbO_5^-$, $Ti_2NbO_7^-$ or $Ti_5NbO_{14}^{3-}$.

Preferred, said anionic metal oxide is $Ti_{0.87}O_2^{0.52-}$, $W_2O_7^{2-}$, $TiNb_6O_5^{5-}$, $Ca_2Nb_3O_{10}^-$, $TaO^{3-}$, $Nb_6O_{17}^{4-}$, $Nb_3O_8^-$, $RuO_{2.1}^{0.2-}$, $RuO_2^{0.2-}$, $SrTa_2O_7^{2-}$, $LaNb_2O_7^-$, $Cs_4W_{11}O_{36}^{2-}$ or several.

The anionic metal oxide was named by the main elements in the metal oxide in the invention, including the metal oxide only composed of the main element and oxygen, such as $W_2O_7^{2-}$, also includes metal oxide consisting of doping element and the main element and oxygen, such as $Ti_{0.8}Co_{0.2}O_2^{0.4-}$, also includes metal oxides composed of several major metal elements and oxygen, such as $Cs_4W_{11}O_{36}^{2-}$. A general process for preparing the aqueous solution of an anionic metal oxide colloid includes preparing a metal oxide single crystal salt by sintering at a high temperature, inserting a guest molecule in the metal oxide single crystal salt, peeling the metal oxide single crystal salt inserted with the guest molecule to obtain metal oxide with rigid structure, then centrifugalizing and washing the exfoliated metal oxide with deionized water to obtain an anionic metal oxide colloid aqueous solution. The cationic metal oxides in the general process for preparing the anionic metal oxide colloidal aqueous solution include manganese oxide, tantalum oxide, ruthenium oxide, tungsten oxide including doped tungsten oxide, niobium oxide including doped niobium oxide, titanium, including doped titanium oxide, and perovskite oxides. Different anionic metal oxide colloid aqueous solution can be prepared by changing the metal oxide as raw material. Anionic metal oxide colloid aqueous solution in the invention refers to the solution formed by the solid anionic metal oxide dispersed in water with a certain size.

In the methods above, said coagulating bath comprises water, methanol, ethanol, acetone or a mixture thereof. Wherein the flocculant is lanthanum salt, aluminum salt, ferric salt, copper salt, calcium salt, magnesium salt, zinc salt, sodium salt, Lithium salt, potassium salt, acetic acid, polyvinyl alcohol, polyethylene glycol, cellulose, chitosan, sodium dodecylsulphate, cetyl trimethyl ammonium bromide, concentrated sulfuric acid, or mixture thereof. Wherein the flocculant is lanthanum chloride, aluminum chloride, ferric nitrate, copper sulphate, calcium chloride, magnesium sulphate, zinc chloride, sodium chloride, lithium fluoride, potassium sulphate, acetic acid, cellulose, chitosan, polyethylene glycol, sodium dodecylsulphate, cetyl trimethyl ammonium bromide, or a mixture thereof. Said coagulation bath contains the flocculant with the mass fraction is between 0.5% to 5% is that the mass of coagulant is between 0.5% to 5% of the total quality of the coagulating bath and flocculant, which is conducive to the forming of the metal oxide fiber, and ensures the structure and mechanical strength of the fiber in the invention.

In the preferred technical scheme, the as-spun fiber is washed by deionized water after drawing. External tension makes as-spun fiber orientation easily, and the draw ratio is between 2 to 8. Deionized water can clean the residual impurities on the surface of the fiber, which is protected the fiber performance from drying process. The best selection in the invention is that the as-spun fiber is washed by deionized water until the pH of washing waste water is 7.

In the method above, the conditions for drying are drying for 0.5 h to 72.0 h between 15° C. to 80° C. The best method is drying 24 h at 25° C.

The diameter of the metal oxide macroscopic fiber is more than 0.1 μm which is prepared with the method of the invention, and the diameter and the length of fiber can be controlled by the diameter of spinneret and the pulling device, these are all in the wet spinning equipment. Acquired metal oxide macroscopic fiber has excellent structure, stable performance, and strong expansion in the application of metal oxide. Therefore, the invention publics a metal oxide macroscopic fiber, which is obtained by the above preparation method.

Effects of the Invention

Beneficial Effects

1. In the invention, the anionic metal oxide aqueous solution is used as a spinning dope, and a wet spinning method is successfully used to prepare metal oxide macroscopic fibers by properly setting conditions of dope concentration, spinning rate, coagulation bath and drying temperature. The obtained metal oxide macroscopic fiber has excellent mechanical properties, and can be assembled to get fiber devices with higher degree of functional combined with its own special physical and chemical properties of metal oxides, so as to achieve the industrial application of pure metal oxide fiber truly.

2. In the method for preparing metal oxides macroscopic fibers disclosed in the invention, the metal oxide having a rigid structure in the aqueous solution of anionic metal oxide forms an anisotropic solution at a suitable solution concentration and temperature. During the preparation of the fibers, they are easy to orientations under shear and tensile flow and anisotropic metal oxides occurs phase transformation to form highly crystalline solid in the process of cooling and solidification, resulting in fibers with high degree of orientation and high crystallinity were obtained.

3. The method for preparing metal oxides macroscopic fibers provided by the invention has the advantages of high efficiency, simple and controllable preparation conditions, and can prepare a great lot of metal oxide fiber with low cost and less pollution, suitable for industrial mass production.

EXAMPLES FOR THE INVENTION

Detailed Description of the Embodiments

Figure 1:
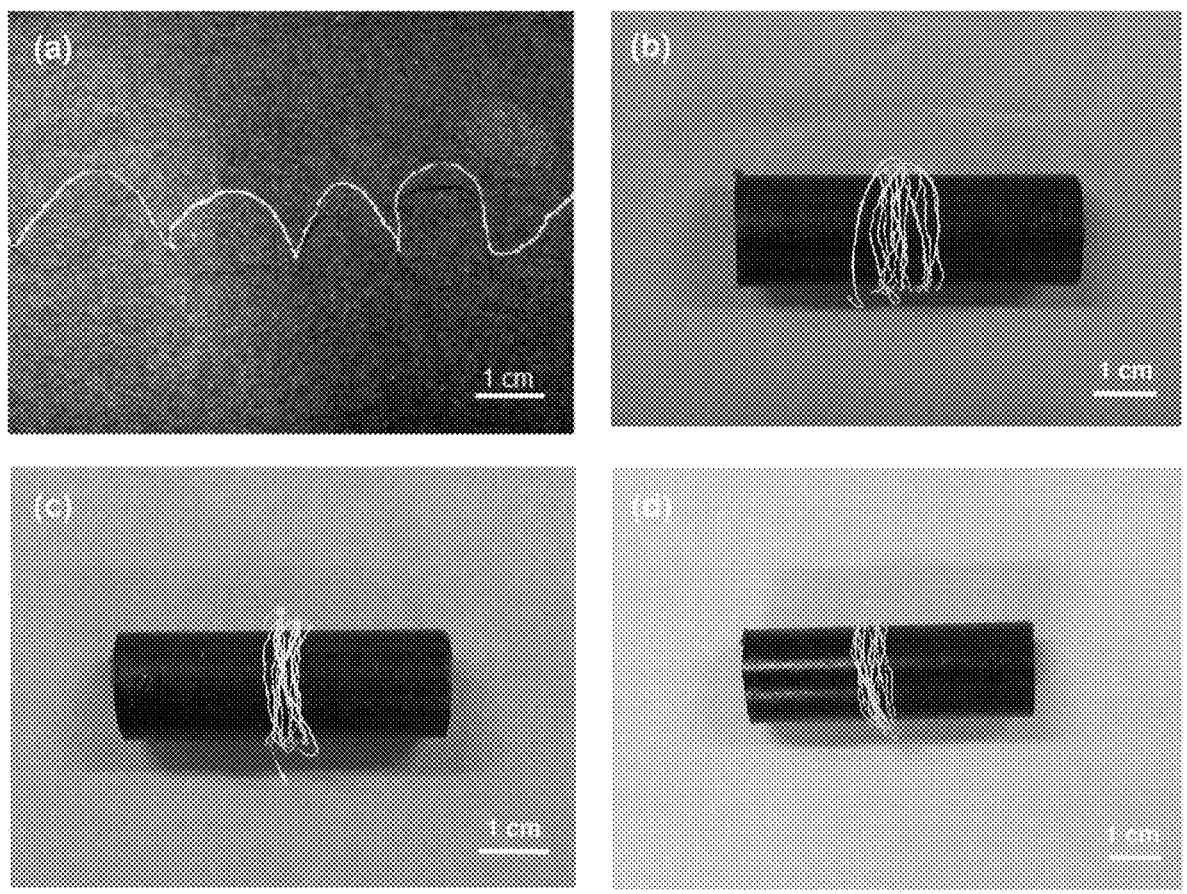
FIG. 1 is an optical photograph of titanium oxide macroscopic fibers prepared in Example.

The present invention will be further described below with reference to the accompanying drawings and embodiments:

Example 1

Chemicals of $TiO_2$, $K_2CO_3$, $Li_2CO_3$, and $MoO_3$ were mixed in the mass ratio of 1.73:1.67:0.13:1.27 and heated at 1073 K for 0.5 h. After cooling to room temperature, the product was heated at 1473 K for 20 h, washed with deionized water and finally got $K_{0.8}[Ti_{1.73}Li_{0.27}]O_4$ crystal. The $H_{1.07}Ti_{1.73}O_4$ was obtained by filtering the reaction solution formed through the $K_{0.8}[Ti_{1.73}Li_{0.27}]O_4$ crystal immersed in 0.5 mol/l HCl solution for 48 h. The $H_{1.07}Ti_{1.73}O_4$ was immersed in tetramethylammonium hydroxide solution, after shaking and reaction for 7 d, and after centrifugation, the solid washed with water to obtain $Ti_{0.87}O_2^{0.52-}$. Other metal oxides can be obtained by changing the raw materials.

Example 2

The colloidal aqueous solution of $Ti_{0.87}O_2^{0.52-}$ with a mass fraction of 0.8 mg/ml was added into wet spinning equipment, and injected into the water solution of chitosan with the mass fraction was 0.6 wt %, which at the spinning speed of 0.5 ml/min, and as-spun fiber was obtained with tensile orientation of fiber at twice tensile speed. The as-spun fiber was washed 3 times with deionized water, until the waste liquid was neutral and dried at 25° C. for 24 hours to obtain a well-oriented titanium oxide fiber.

Example 3

The colloidal aqueous solution of $Ti_{0.87}O_2^{0.52-}$ with a mass fraction of 0.8 mg/ml was added into wet spinning equipment, and injected into the water solution of chitosan with the mass fraction was 0.6%, which at the spinning speed of 1.5 ml/min, and as-spun fiber was obtained with tensile orientation of fiber at twice tensile speed. The as-spun fiber was washed 3 times with deionized water, and dried at 25° C. for 24 hours to obtain a well-oriented titanium oxide fiber.

Example 4

The colloidal aqueous solution of $Ti_{0.87}O_2^{0.52-}$ with a mass fraction of 0.8 mg/ml was added into wet spinning equipment, and injected into the coagulation bath consist of water and chitosan of the mass fraction was 1.2%, which at the spinning speed of 1.5 ml/min, and as-spun fiber was obtained with tensile orientation of fiber at twice tensile speed. The as-spun fiber was washed 3 times with deionized water, and dried at 25° C. for 24 hours to obtain a well-oriented titanium oxide fiber.

Example 5

The colloidal aqueous solution of $Ti_{0.87}O_2^{0.52-}$ with a mass fraction of 0.8 mg/ml was added into wet spinning equipment, and injected into the coagulation bath consist of water and chitosan of the mass fraction was 1.2%, which at the spinning speed of 1.5 ml/min, and as-spun fiber was obtained with tensile orientation of fiber at eight-fold tensile speed. The as-spun fiber was washed 3 times with deionized water, and dried at 25° C. for 24 hours to obtain a well-oriented titanium oxide fiber.

Example 6

The colloidal aqueous solution of $Ti_{0.87}O_2^{0.52-}$ with a mass fraction of 0.8 mg/ml was added into wet spinning equipment, and injected into the coagulation bath consist of water and chitosan of the mass fraction was 1.2%, which at the spinning speed of 1.5 ml/min, and as-spun fiber was obtained with tensile orientation of fiber at eight-fold tensile speed. The as-spun fiber was washed 3 times with deionized water, and dried at 65° C. for 12 hours to obtain a well-oriented titanium oxide fiber.

Example 7

The colloidal aqueous solution of $Ti_{0.87}O_2^{0.52-}$ with a mass fraction of 0.8 mg/ml was added into wet spinning equipment, and injected into the coagulation bath consist of water and chitosan of the mass fraction was 4.5%, which at the spinning speed of 1.5 ml/min, and as-spun fiber was obtained with tensile orientation of fiber at twice tensile speed. The as-spun fiber was washed 3 times with deionized water, and dried at 25° C. for 24 hours to obtain a well-oriented titanium oxide fiber.

Example 8

The colloidal aqueous solution of $Ti_{0.87}O_2^{0.52-}$ with a mass fraction of 0.8 mg/ml was added into wet spinning equipment, and injected into the coagulation bath consist of water and chitosan of the mass fraction was 0.6%, which at the spinning speed of 4.5 ml/min, and as-spun fiber was obtained with tensile orientation of fiber at twice tensile speed. The as-spun fiber was washed 3 times with deionized water, and dried at 25° C. for 24 hours to obtain a well-oriented titanium oxide fiber.

Example 9

The colloidal aqueous solution of $Ti_{0.87}O_2^{0.52-}$ with a mass fraction of 0.8 mg/ml was added into wet spinning equipment, and injected into the coagulation bath consist of water, ethanol and chitosan of the mass fraction was 1.2%, which at the spinning speed of 1.5 ml/min, and as-spun fiber was obtained with tensile orientation of fiber at twice tensile speed. The as-spun fiber was washed 3 times with deionized water, and dried at 25° C. for 24 hours to obtain a well-oriented titanium oxide fiber.

Example 10

The colloidal aqueous solution of $Ti_{0.87}O_2^{0.52-}$ with a mass fraction of 0.8 mg/ml was added into wet spinning equipment, and injected into the coagulation bath consist of water, acetic acid of the mass fraction was 4% and chitosan of the mass fraction was 1.2%, which at the spinning speed of 1.5 ml/min, and as-spun fiber was obtained with tensile orientation of fiber at twice tensile speed. The as-spun fiber was washed 3 times with deionized water, and dried at 25° C. for 24 hours to obtain a well-oriented titanium oxide fiber.

Example 11

The colloidal aqueous solution of $Ti_{0.87}O_2^{0.52-}$ with a mass fraction of 0.8 mg/ml was added into wet spinning equipment, and injected into the coagulation bath consist of ethanol and sodium chloride of the mass fraction was 4%, which at the spinning speed of 1.5 ml/min, and as-spun fiber was obtained with tensile orientation of fiber at quadruple tensile speed. The as-spun fiber was washed 3 times with deionized water, and dried at 25° C. for 24 hours to obtain a well-oriented titanium oxide fiber.

Example 12

The colloidal aqueous solution of $Ti_{0.87}O_2^{0.52-}$ with a mass fraction of 0.8 mg/ml was added into wet spinning equipment, and injected into the coagulation bath consist of water and lanthanum chloride of the mass fraction was 1.3%, which at the spinning speed of 1.5 ml/min, and as-spun fiber was obtained with tensile orientation of fiber at quadruple tensile speed. The as-spun fiber was washed 3 times with deionized water, and dried at 25° C. for 24 hours to obtain a well-oriented titanium oxide fiber.

Example 13

The colloidal aqueous solution of $Ti_{0.87}O_2^{0.52-}$ with a mass fraction of 0.8 mg/ml was added into wet spinning equipment, and injected into the coagulation bath consist of water and calcium chloride of the mass fraction was 2.5%, which at the spinning speed of 2.5 ml/min, and as-spun fiber was obtained with tensile orientation of fiber at quintuple tensile speed. The as-spun fiber was washed 3 times with deionized water, and dried at 25° C. for 24 hours to obtain a well-oriented titanium oxide fiber.

FIG. 1 was an optical photograph of the titanium oxide macroscopic fiber, wherein a was the Example 2, b was the Example 7, c was the Example 9, d was the Example 13. It can be seen that length of macroscopic fiber sample prepared in the invention was about 15 cm and diameter was about 500 μm. The fiber can be wrapped well, proving its good flexibility.

Figure 2:
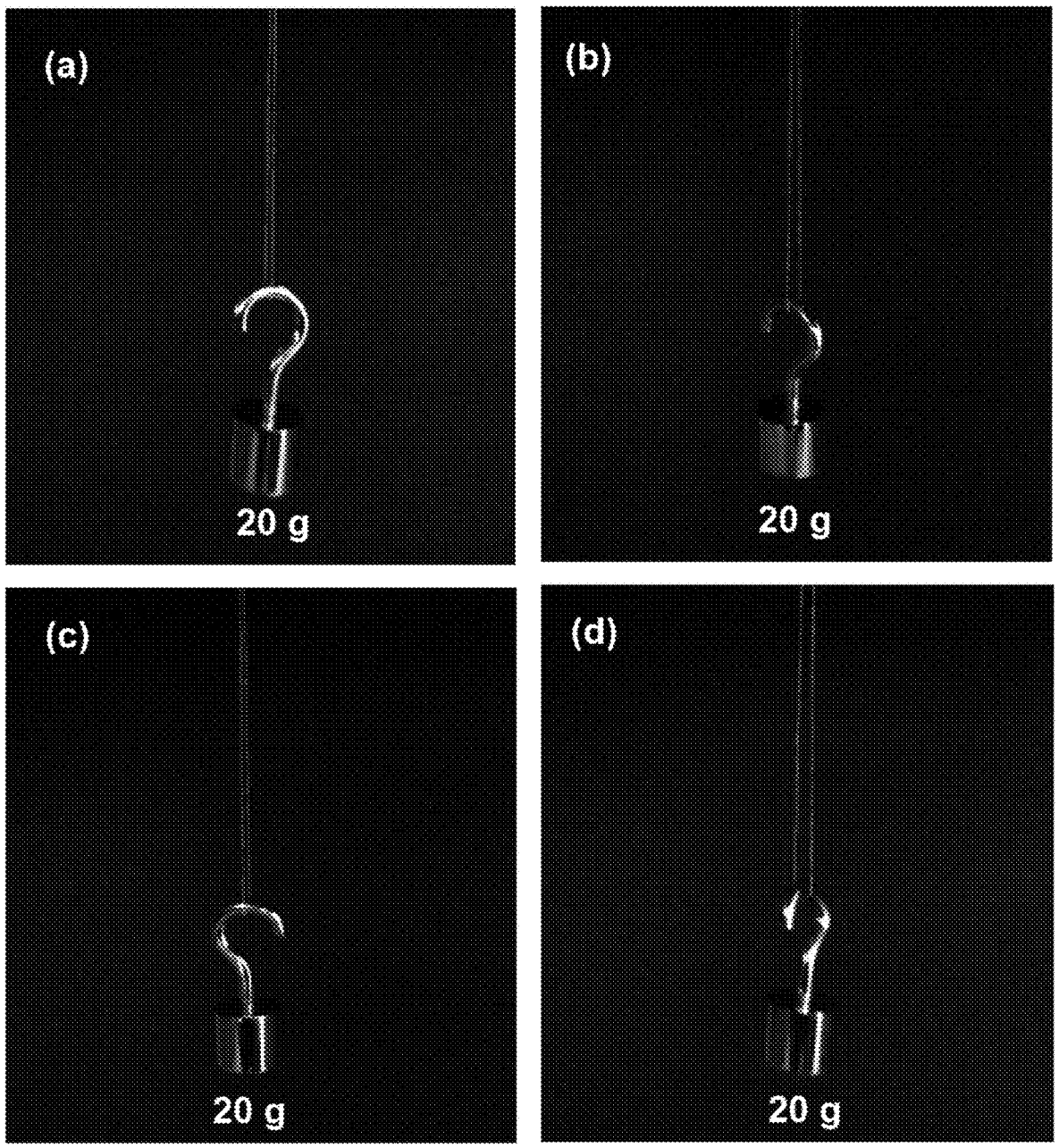
FIG. 2 is a photograph of a mechanical test of the titanium oxide macroscopic fibers in Example.

FIG. 2 was a photograph of the mechanical test of the above titanium oxide macroscopic fiber, wherein a was the Example 2, b was the Example 7, c was the Example 9, d was the Example 13. It can be seen that the single fiber was able to bear standard weight of 20 g, and the tensile strength was 160 MPa, 150 MPa, 150 MPa, 165 MPa respectively. It was indicated that the metal oxide macroscopic fibers provided by the invention have excellent mechanical properties and were suitable for industrial applications of flexible devices. sodium dodecylsulphate, cetyl trimethyl ammonium bromide.

Example 14

The colloidal aqueous solution of $Ti_{0.87}O_2^{0.52-}$ with a mass fraction of 0.8 mg/ml was added into wet spinning equipment, and injected into the coagulation bath consist of water and sodium dodecylsulphate of the mass fraction was 3%, which at the spinning speed of 2.5 ml/min, and as-spun fiber was obtained with tensile orientation of fiber at twice tensile speed. The as-spun fiber was washed 3 times with deionized water, and dried at 25° C. for 24 hours to obtain a well-oriented titanium oxide fiber.

Example 15

The colloidal aqueous solution of $Ti_{0.87}O_2^{0.52-}$ with a mass fraction of 0.8 mg/ml was added into wet spinning equipment, and injected into the coagulation bath consist of water and polyethylene glycol of the mass fraction was 2.5%, which at the spinning speed of 2.5 ml/min, and as-spun fiber was obtained with tensile orientation of fiber at quadruple tensile speed. The as-spun fiber was washed 3 times with deionized water, and dried at 25° C. for 24 hours to obtain a well-oriented titanium oxide fiber.

Example 16

The colloidal aqueous solution of $Ti_{0.87}O_2^{0.52-}$ with a mass fraction of 3.6 mg/ml was added into wet spinning equipment, and injected into the coagulation bath consist of water and chitosan of the mass fraction was 2.5%, which at the spinning speed of 2.5 ml/min, and as-spun fiber was obtained with tensile orientation of fiber at quadruple tensile speed. The as-spun fiber was washed 5 times with deionized water, and dried at 25° C. for 24 hours to obtain a well-oriented titanium oxide fiber.

Example 17

The colloidal aqueous solution of $Ti_{0.87}O_2^{0.52-}$ with a mass fraction of 8 mg/ml was added into wet spinning equipment, and injected into the coagulation bath consist of water and chitosan of the mass fraction was 2.5%, which at the spinning speed of 4 ml/min, and as-spun fiber was obtained with tensile orientation of fiber at quadruple tensile speed. The as-spun fiber was washed 3 times with deionized water, and dried at 25° C. for 24 hours to obtain a well-oriented titanium oxide fiber.

Example 18

The colloidal aqueous solution of $Ti_{0.87}O_2^{0.52-}$ with a mass fraction of 15 mg/ml was added into wet spinning equipment, and injected into the coagulation bath consist of water and chitosan of the mass fraction was 2.5%, which at the spinning speed of 4 ml/min, and as-spun fiber was obtained with tensile orientation of fiber at quadruple tensile speed. The as-spun fiber was washed 3 times with deionized water, and dried at 25° C. for 24 hours to obtain a well-oriented titanium oxide fiber.

Example 19

The colloidal aqueous solution of $Ti_{0.87}O_2^{0.52-}$ with a mass fraction of 15 mg/ml was added into wet spinning equipment, and injected into the coagulation bath consist of water and sodium chloride of the mass fraction was 2.5% and calcium chloride of the mass fraction was 0.5%, which at the spinning speed of 4 ml/min, and as-spun fiber was obtained with tensile orientation of fiber at quintuple tensile speed. The as-spun fiber was washed 3 times with deionized water, and dried at 60° C. for 12 hours to obtain a well-oriented titanium oxide fiber.

Example 20

The colloidal aqueous solution of $W_2O_7^{2-}$ with a mass fraction of 12 mg/ml was added into wet spinning equipment, and injected into the coagulation bath consist of water and calcium chloride of the mass fraction was 0.2%, which at the spinning speed of 3 ml/min, and as-spun fiber was obtained with tensile orientation of fiber at quadruple tensile speed. The as-spun fiber was washed 3 times with deionized water, and dried at 45° C. for 14 hours to obtain a well-oriented tungsten oxide fiber.

Example 21

The colloidal aqueous solution of $TiNb_6O_5^{5-}$ with a mass fraction of 8 mg/ml was added into wet spinning equipment, and injected into the coagulation bath consist of water and chitosan of the mass fraction was 0.5%, which at the spinning speed of 1.5 ml/min, and as-spun fiber was obtained with tensile orientation of fiber at quadruple tensile speed. The as-spun fiber was washed 3 times with deionized water, and dried at 55° C. for 12 hours to obtain a well-oriented titanium niobium oxide fiber.

Example 22

The colloidal aqueous solution of $Ca_2Nb_3O_{10}^{-}$ with a mass fraction of 4 mg/ml was added into wet spinning equipment, and injected into the coagulation bath consist of water and chitosan of the mass fraction was 1.8%, which at the spinning speed of 1.5 ml/min, and as-spun fiber was obtained with tensile orientation of fiber at quadruple tensile speed. The as-spun fiber was washed 3 times with deionized water, and dried at 25° C. for 24 hours to obtain a well-oriented calcium niobium oxide fiber.

Example 23

The colloidal aqueous solution of $TaO^{3-}$ with a mass fraction of 5 mg/ml was added into wet spinning equipment, and injected into the coagulation bath consist of water and polyethylene glycol of the mass fraction was 4%, which at the spinning speed of 2.5 ml/min, and as-spun fiber was obtained with tensile orientation of fiber at quintuple tensile speed. The as-spun fiber was washed 3 times with deionized water, and dried at 25° C. for 24 hours to obtain a well-oriented tantalum oxide fiber.

Example 24

The colloidal aqueous solution of $SrTa_2O_7^{2-}$ with a mass fraction of 2.5 mg/ml was added into wet spinning equipment, and injected into the coagulation bath consist of water and calcium chloride of the mass fraction was 2%, which at the spinning speed of 1.5 ml/min, and as-spun fiber was obtained with tensile orientation of fiber at twice tensile speed. The as-spun fiber was washed 3 times with deionized water, and dried at 65° C. for 8 hours to obtain a well-oriented strontium tantalum oxide fiber.

Example 25

The colloidal aqueous solution of $LaNb_2O_7^-$ with a mass fraction of 12 mg/ml was added into wet spinning equipment, and injected into the coagulation bath consist of water and chitosan of the mass fraction was 1.5%, which at the spinning speed of 3 ml/min, and as-spun fiber was obtained with tensile orientation of fiber at quadruple tensile speed. The as-spun fiber was washed 3 times with deionized water, and dried at 80° C. for 2 hours to obtain a well-oriented lanthanum niobium oxide fiber.

Example 26

The colloidal aqueous solution of $Cs_4W_{11}O_{36}^{2-}$ with a mass fraction of 8 mg/ml was added into wet spinning equipment, and injected into the coagulation bath consist of water and polyethylene glycol of the mass fraction was 2.5%, which at the spinning speed of 1.5 ml/min, and as-spun fiber was obtained with tensile orientation of fiber at sextuple tensile speed. The as-spun fiber was washed 3 times with deionized water, and dried at 25° C. for 24 hours to obtain a well-oriented cesium tungsten oxide fiber.

Example 27

The colloidal aqueous solution of $Nb_6O_{17}^{4-}$ with a mass fraction of 5 mg/ml was added into wet spinning equipment, and injected into the coagulation bath consist of water and cellulose of the mass fraction was 2.5%, which at the spinning speed of 4 ml/min, and as-spun fiber was obtained with tensile orientation of fiber at quadruple tensile speed. The as-spun fiber was washed 3 times with deionized water, and dried at 25° C. for 24 hours to obtain a well-oriented niobium oxide fiber.

Example 28

The colloidal aqueous solution of $RuO_2^{0.2-}$ with a mass fraction of 4 mg/ml was added into wet spinning equipment, and injected into the coagulation bath consist of water and potassium sulphate of the mass fraction was 1.5%, which at the spinning speed of 2.5 ml/min, and as-spun fiber was obtained with tensile orientation of fiber at quadruple tensile speed. The as-spun fiber was washed 3 times with deionized water, and dried at 45° C. for 16 hours to obtain a well-oriented ruthenium oxide fiber.

Example 29

The colloidal aqueous solution of $Ti_{0.87}O_2^{0.52-}$ with a mass fraction of 4 mg/ml was added into wet spinning equipment, and injected into the coagulation bath consist of water and aluminum chloride of the mass fraction was 1.2%, which at the spinning speed of 1.5 ml/min, and as-spun fiber was obtained with tensile orientation of fiber at quintuple tensile speed. The as-spun fiber was washed 3 times with deionized water, and dried at 35° C. for 18 hours to obtain a well-oriented titanium oxide fiber.

Example 30

The colloidal aqueous solution of $Ti_{0.87}O_2^{0.52-}$ with a mass fraction of 4 mg/ml was added into wet spinning equipment, and injected into the coagulation bath consist of water and ferric nitrate of the mass fraction was 1.8%, which at the spinning speed of 1.5 ml/min, and as-spun fiber was obtained with tensile orientation of fiber at quadruple tensile speed. The as-spun fiber was washed 3 times with deionized water, and dried at 25° C. for 24 hours to obtain a well-oriented titanium oxide fiber.

Example 31

The colloidal aqueous solution of $Ti_{0.87}O_2^{0.52-}$ with a mass fraction of 4 mg/ml was added into wet spinning equipment, and injected into the coagulation bath consist of water and copper sulphate of the mass fraction was 2.1%, which at the spinning speed of 1.5 ml/min, and as-spun fiber was obtained with tensile orientation of fiber at quadruple tensile speed. The as-spun fiber was washed 3 times with deionized water, and dried at 25° C. for 24 hours to obtain a well-oriented titanium oxide fiber.

Example 32

The colloidal aqueous solution of $Ti_{0.87}O_2^{0.52-}$ with a mass fraction of 4 mg/ml was added into wet spinning equipment, and injected into the coagulation bath consist of water and magnesium sulphate of the mass fraction was 1.7%, which at the spinning speed of 1.2 ml/min, and as-spun fiber was obtained with tensile orientation of fiber at quadruple tensile speed. The as-spun fiber was washed 3 times with deionized water, and dried at 25° C. for 24 hours to obtain a well-oriented titanium oxide fiber.

Example 33

The colloidal aqueous solution of $Ti_{0.87}O_2^{0.52-}$ with a mass fraction of 4 mg/ml was added into wet spinning equipment, and injected into the coagulation bath consist of water and zinc chloride of the mass fraction was 2.4%, which at the spinning speed of 1.2 ml/min, and as-spun fiber was obtained with tensile orientation of fiber at quadruple tensile speed. The as-spun fiber was washed 3 times with deionized water, and dried at 25° C. for 24 hours to obtain a well-oriented titanium oxide fiber.

Example 34

The colloidal aqueous solution of $Ti_{0.87}O_2^{0.52-}$ with a mass fraction of 4 mg/ml was added into wet spinning equipment, and injected into the coagulation bath consist of water and lithium fluoride of the mass fraction was 5%, which at the spinning speed of 1.5 ml/min, and as-spun fiber was obtained with tensile orientation of fiber at sextuple tensile speed. The as-spun fiber was washed 3 times with deionized water, and dried at 25° C. for 24 hours to obtain a well-oriented titanium oxide fiber.

Example 35

The colloidal aqueous solution of $Ti_{0.87}O_2^{0.52-}$ with a mass fraction of 4 mg/ml was added into wet spinning equipment, and injected into the coagulation bath consist of water and potassium sulphate of the mass fraction was 5%, which at the spinning speed of 1.5 ml/min, and as-spun fiber was obtained with tensile orientation of fiber at quintuple tensile speed. The as-spun fiber was washed 3 times with deionized water, and dried at 25° C. for 24 hours to obtain a well-oriented titanium oxide fiber.

Example 36

The colloidal aqueous solution of $Ti_{0.87}O_2^{0.52-}$ with a mass fraction of 4 mg/ml was added into wet spinning equipment, and injected into the coagulation bath consist of water and cellulose of the mass fraction was 2.3%, which at the spinning speed of 1.7 ml/min, and as-spun fiber was obtained with tensile orientation of fiber at octuple tensile speed. The as-spun fiber was washed 3 times with deionized water, and dried at 45° C. for 18 hours to obtain a well-oriented titanium oxide fiber.

Example 37

The colloidal aqueous solution of $Ti_{0.87}O_2^{0.52-}$ with a mass fraction of 4 mg/ml was added into wet spinning equipment, and injected into the coagulation bath at the spinning speed of 1.2 ml/min, which consist of water and cetyl trimethyl ammonium bromide with the mass fraction of 5%. As-spun fiber was obtained with tensile orientation of fiber at twice tensile speed. The as-spun fiber was washed 3 times with deionized water, and dried at 25° C. for 24 hours to obtain a well-oriented titanium oxide fiber.

The invention claimed is:

1. A method for preparing metal oxide macroscopic fiber, characterized in that it comprises the following steps:
   providing an anionic metal oxide colloidal aqueous solution;
   obtaining an as-spun fiber by wet spinning the anionic metal oxide colloidal aqueous solution in a coagulating bath; and
   washing the as-spun fiber with deionized water and drying the same, thereby obtaining the metal oxide macroscopic fiber;
   wherein said coagulation bath contains a flocculant with the mass fraction being between 0.5% to 5%, and speed of the wet spinning is between 0.1 ml/min to 5 ml/min; the anionic metal oxide colloidal aqueous solution consists of 0.1 mg/ml to 20 mg/ml of anionic metal oxide dispersed in water.

2. The method for preparing metal oxide macroscopic fiber of claim 1, wherein the anionic metal oxide is manganese oxide, ruthenium oxide, titanium oxide, niobium oxide, tantalum oxide, tungsten oxide, cesium tungsten oxide, calcium niobium oxide, titanium niobium oxide or a mixture thereof.

3. The method for preparing metal oxide macroscopic fiber of claim 2, wherein the manganese oxide is $MnO_2^{x-}$, $0<x<1$, or $A_2Na_{y-3}MnO_{3y+1}^{-}$, in which A is Ca, Sr, Ba, $3 \leq y \leq 6$, said tantalum oxide is $TaO^{3-}$, $SrTa_2O_7^{2-}$, $La_{0.7}Tb_{0.3}Ta_2O_7^{-}$ or $Eu_{0.56}Ta_2O_7^{2-}$, said tungsten oxide is $W_2O_7^{2-}$, said cesium tungsten oxide is $Cs_4W_{11}O_{36}^{2-}$, said ruthenium oxide is $RuO_{2.1}^{z-}$ or $RuO_2^{z-}$, $0<z<1$, said niobium oxide is $Nb_6O_{17}^{4-}$, $Nb_3O_8^{-}$, $LaNb_2O_7^{-}$ or $La_{0.9}Eu_{0.05}Nb_2O_7^{-}$, said titanium oxide is $Ti_{1-n}O_2^{4n-}$, $0<n<1$, $Ti_{0.8}Co_{0.2}O_2^{0.4-}$, $Bi_4Ti_3O_{12}^{2-}$, $Ti_{0.6}Fe_{0.4}O_2^{0.4-}$, $Ti_{0.8-m/4}Fe_{m/2}Co_{0.2-m/4}O_2^{0.4-}$, $0 \leq m \leq 0.8$, $Ti_{(5.2-2i)/6}Mn_{i/2}O_2^{(3.2-1i)/6-}$, $0 \leq i \leq 0.4$ or $RE_2Ti_3O_{10}^{2-}$, in which RE is La, Pr, Sm, Nd, Eu, Gd, Tb or Dy, said calcium niobium oxide is $Ca_2Nb_3O_{10}^{-}$, said titanium niobium oxide is $TiNbO_5^{-}$, $Ti_2NbO_7^{-}$ or $Ti_5NbO_{14}^{3-}$.

4. The method for preparing metal oxide macroscopic fiber of claim 3, wherein the anionic metal oxide is $Ti_{0.87}O_2^{0.52-}$, $W_2O_7^{2-}$, $TiNb_6O_5^{5-}$, $Ca_2Nb_3O_{10}^{-}$, $TaO^{3-}$, $Nb_6O_{17}^{4-}$, $Nb_3O_8^{-}$, $RuO_{2.1}^{0.2-}$, $RuO_2^{0.2-}$, $SrTa_2O_7^{2-}$, $LaNb_2O_7^{-}$, $Cs_4W_{11}O_{36}^{2-}$ or a mixture thereof.

5. The method for preparing metal oxide macroscopic fiber of claim 1, wherein the coagulating bath comprises water, methanol, ethanol, acetone or a mixture thereof.

6. The method for preparing metal oxide macroscopic fiber of claim 1, wherein the flocculant is lanthanum salt, aluminum salt, ferric salt, copper salt, calcium salt, magnesium salt, zinc salt, sodium salt, Lithium salt, potassium salt, acetic acid, polyvinyl alcohol, polyethylene glycol, cellulose, chitosan, sodium dodecylsulphate, cetyl trimethyl ammonium bromide, concentrated sulfuric acid, or mixture thereof.

7. The method for preparing metal oxide macroscopic fiber of claim 6, wherein the flocculant is lanthanum chloride, aluminum chloride, ferric nitrate, copper sulphate, calcium chloride, magnesium sulphate, zinc chloride, sodium chloride, lithium fluoride, potassium sulphate, acetic acid, cellulose, polyethylene glycol, chitosan, sodium dodecylsulphate, cetyl trimethyl ammonium bromide, or a mixture thereof.

8. The method for preparing metal oxide macroscopic fiber of claim 1, wherein the as-spun fiber is washed by deionized water after drawing, and the draw ratio is between 2 to 8.

9. The method for preparing metal oxide macroscopic fiber of claim 1, wherein the as-spun fiber is washed by deionized water until the pH of washing waste water is 7, and the conditions for drying are drying for 0.5 h to 72.0 h between 15° C. to 80° C.

* * * * *